May 12, 1959 P. J. FLETCHER 2,886,262
AIRCRAFT JET SYSTEM WITH ADJUSTABLE NOZZLE
Filed Oct. 12, 1953 5 Sheets-Sheet 1

Philip John Fletcher Inventor
By Stevens, Davis, Miller & Mosher
his Attorneys

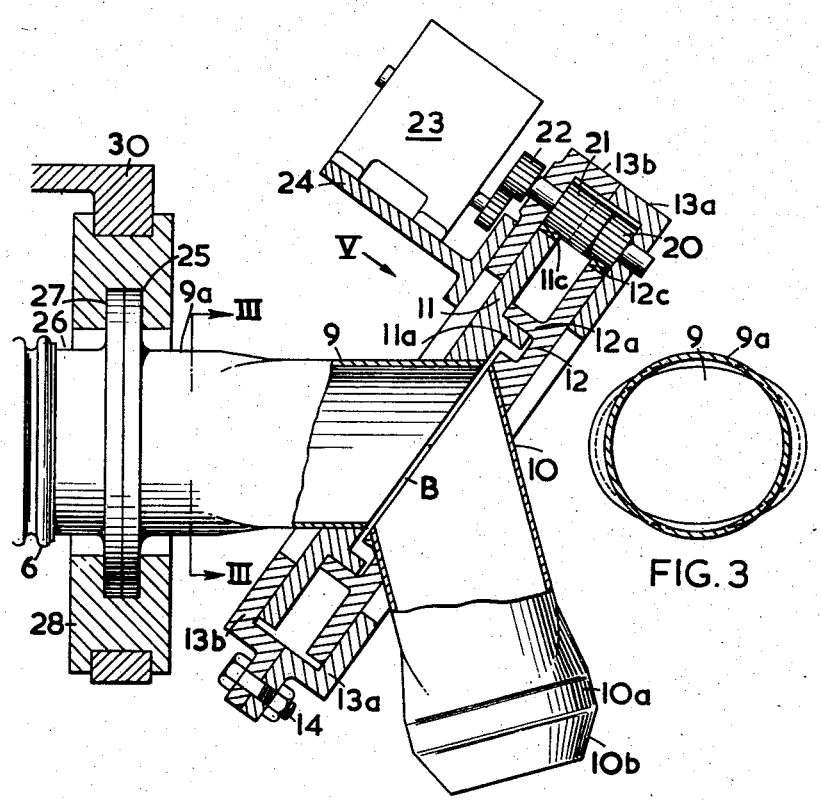

May 12, 1959 P. J. FLETCHER 2,886,262
AIRCRAFT JET SYSTEM WITH ADJUSTABLE NOZZLE
Filed Oct. 12, 1953 5 Sheets-Sheet 4

Inventor
Philip John Fletcher
By
Stevens, Davis, Miller & Mosher
Attorneys

United States Patent Office 2,886,262
Patented May 12, 1959

2,886,262
AIRCRAFT JET SYSTEM WITH ADJUSTABLE NOZZLE

Philip John Fletcher, Cove, Farnborough, England, assignor to Power Jets (Research and Development) Limited, London, England, a British company Application October 12, 1953, Serial No. 385,629

Claims priority, application Great Britain October 23, 1952

4 Claims. (Cl. 244—23)

This invention relates to a device for diverting a jet of fluid smoothly from one direction to another by swivelling a jet pipe through which the fluid flows. The invention is particularly applicable to a swivelling nozzle device on the jet pipe of a jet propelled aircraft for diverting the jet from the rearward direction to the downward direction—i.e. from the direction in which the jet acts as a propulsive jet for forward flight to one in which it produces an upthrust for assisting either take-off or slow-speed landing.

An object of the invention is to eliminate multiple bends in the jet path and to provide a substantially straight path in at least one direction—i.e. the direction for normal rearward discharge in a jet-propelled aircraft. A form of swivelling nozzle device comprising a jet pipe extending transversely across the aircraft and a nozzle thereon which can swivel about the jet pipe axis from a position in which it can discharge a jet rearwardly through a right-angled bend to one in which it can discharge the jet downwardly through a right-angled bend has been proposed this has the merit of simplicity but involves at least one right-angled bend of the jet for forward propulsion and more than one bend if the power plant must be mounted so that the flow through it is longitudinally along the aircraft. Thus the invention aims at removing these particular disadvantages.

Broadly, the invention provides a nozzle device which can be moved from a position in which it forms substantially a straight continuation of the pipe—e.g. the axes of pipe and nozzle form one straight line directed rearwardly—to one in which the nozzle axis is transverse to the pipe axis—e.g. downwardly, the motion being by rotation of the nozzle about an axis which is co-planar with but is between the two positions of the nozzle axis. Thus there are provided motive means for rotating the nozzle and means for constraining the nozzle to turn about the said intermediate axis.

Furthermore, with the object of keeping the axis of the nozzle always in one plane, so that the nozzle will not point sideways in either direction during transition, the swivelling nozzle device on the end of the pipe includes two nozzle tubes meeting end-to-end on a plane lying obliquely across the axis of the pipe, and there are provided means constraining the two nozzle tubes to meet always on the said oblique plane and motive means for rotating both nozzle tubes equally in opposite directions.

The invention is illustrated by the accompanying drawings of which:

Fig. 1 shews in outline how a jet engine with a swivelling nozzle according to the invention is mounted in an aircraft to give a rearwardly or downwardly directed jet;

Fig. 2 is a view to a larger scale, and partly in section, of the swivelling nozzle unit on the end of the jet pipe, with the nozzle directed downwardly;

Fig. 3 is a cross section on III—III of Fig. 2;

Figure 1:
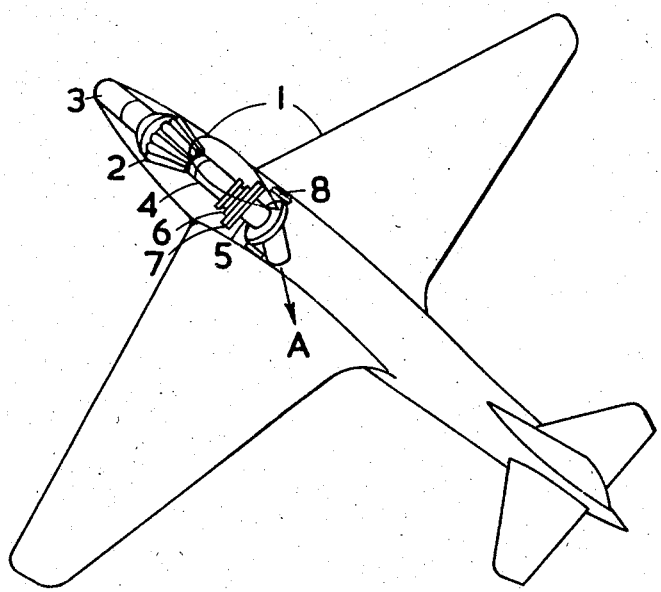

In Fig. 1 an aircraft 1 is propelled by a jet engine 2 having a forward inlet 3 and discharging rearward through a jet pipe 4 terminating in a swivelling nozzle device 5. The latter is connected to the jet pipe by the usual bellows or spherical joint 6 to allow for thermal expansion and is supported partly by the bearing arrangement 7 and partly by the supports 8 on each side of the nozzle.

Figure 6:
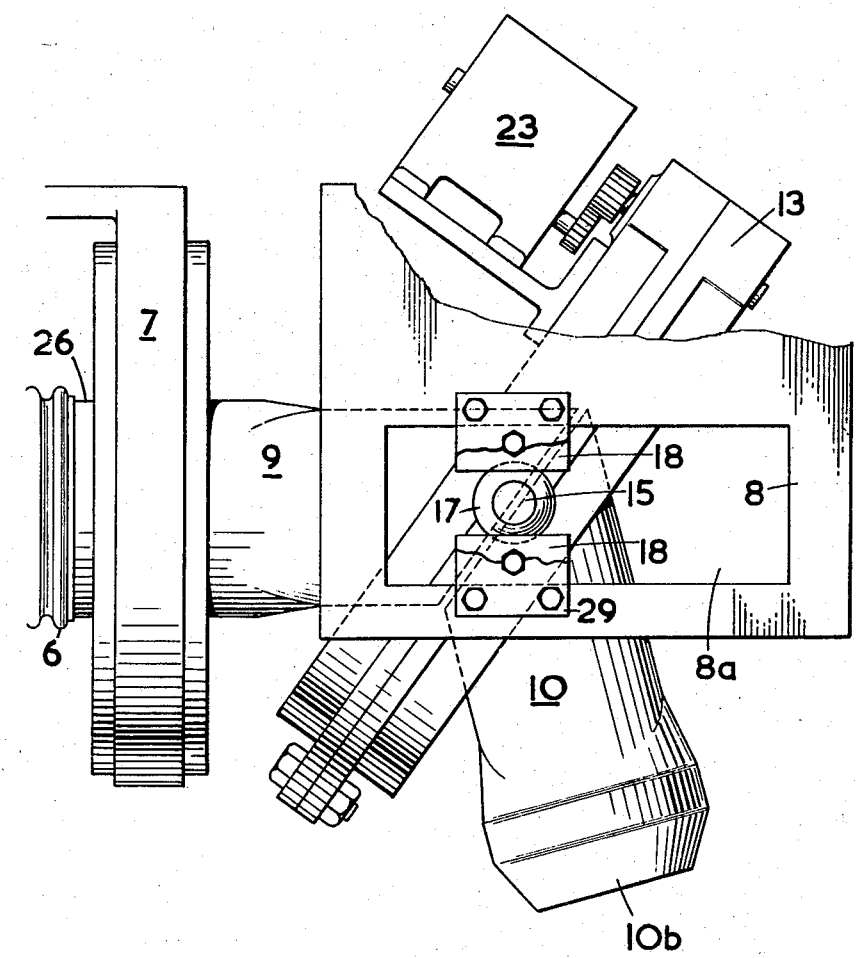
Fig. 6 is an external view corresponding to Fig. 2 and shewing the supporting guides.

As shewn in Figs, 2, 4 and 6 the nozzle device includes a forward tube 9 co-axial with the jet pipe but mounted for rotation in the bearing arrangement 7 carried by the aircraft structure, and a rear nozzle tube 10 which can swivel between a position also co-axial with the jet pipe and the downwardly-inclined position in which it is shewn in Figs. 2 and 6. In the latter position the jet is directed downwardly as indicated by the arrow A in Fig. 1, along an axis which passes through or near to the centre of gravity of the aircraft.

At its rear the tube 9 is bevelled or scarfed on the plane B of Fig. 2. If the nozzle be designed for turning from the horizontal rearward to the vertically downward direction—i.e. through 90°—the tube will be scarfed at 45°. If the nozzle be designed as shewn to turn through a smaller angle, such as 70°, the bevelling will be at 55°, and so on. At its forward end 9a the tube 9—like the jet pipe 4—is of circular cross section and of the same diameter as the jet pipe; along its length, this tube 9 changes smoothly from the circular cross section to an elliptical cross section of the same internal area, such that the shape of the rear end on the plane B of the scarf is circular. These circular and elliptic sections can be seen in Fig. 3.

The tube 10 is scarfed at its front end oppositely to the tube 9 at the same angle, so as to be complementary thereto; thus tube 10 is also circular on the plane B and of the same diameter as tube 9 and changes smoothly to circular cross-section at the rear end 10a. Thus tube 10 is in fact the counterpart of the tube 9, but at its rear it terminates in a circular nozzle 10b of reduced cross-section which may be integral with the tube or formed separately and attached thereto. The nozzle 10b terminates in a plane at right angles to the axis of the nozzle pipe—a plane which is vertical when the axis points rearwardly.

The scarfed ends of pipes 9 and 10 are provided with abutting circular flanges 11 and 12 respectively constructed to form a running joint permitting relative rotation but substantially sealed against leakage of gas from the jet, and are held together in abutment by casing 13 which is supported by the guides 8 all as hereinafter set forth.

Figures 7A, 7B, 7C:
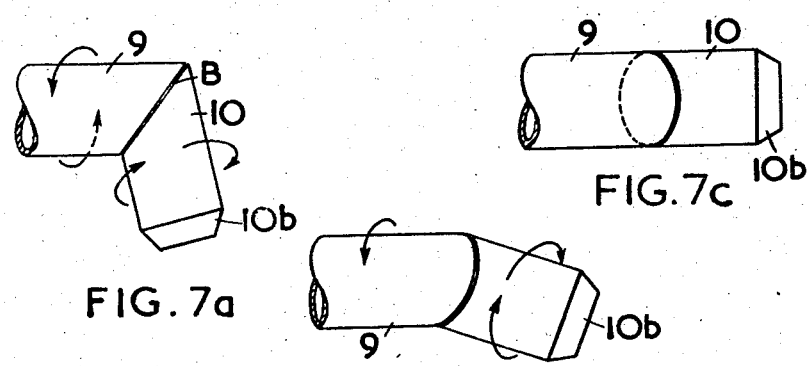
Figs. 7a, 7b and 7c are diagrams illustrating the principle of the device shewn in the other figures.

Before proceeding to describe this construction in detail however, it is best to explain the principle of the invention by reference to the diagrams, Figs. 7a, 7b and 7c. When the tube 10, with the nozzle 10b, is pointing downwards as in Fig. 7a at say 70° to the horizontal the bevel plane B forming the junction of the tubes 9 and 10 is inclined at 55° to the horizontal. The longest part of tube 9 is at the top and the shortest at the bottom. If, with tube 9 fixed, an attempt be made to turn tube 10 about its own axis but with abutment of the bevelled ends on plane B maintained, the tube 10 will swivel in space around an axis normal to the plane B and lying between the horizontal and the initial 70° inclination of the axis of pipe 10; during transition, pipe 10 will point partly sideways, but eventually it will be horizontal and pointing rearwardly, in axial alignment with pipe 9. It will be found however that if tube 9 be also rotated about its axis (which is horizontal) while tube 10 is rotating at the same speed in the opposite direction, both rotations being indicated by arrows, tube 10 will now gradually swing outwards and upwards as if hinged to tube 9 about a horizontal pivot through the intersection of their axes—i.e. without swinging to either side; when each tube, after passing through positions as shewn in Fig. 7b, has turned through 90° about its own axis, the tube 10 will be pointing rearward with its axis horizontal as in Fig. 7c. In this position the jet pipe 4 and the tubes 9 and 10 will be co-axial and form a straight horizontal pipe. The longest part of tube 9 is now on one side and the shortest on the other, as can be seen from Fig. 7c.

Again it will be seen that the tube 10 rotates about an axis which, during transition, lies between the horizontal and the initial 70° downward inclination. This axis however now hinges about its point of intersection with the axes of tubes 9 and 10 while always keeping in the vertical plane, and the axis of the tube 10 is always co-incident with this axis of rotation.

Referring now to Fig. 2 again for a more detailed description, the circular scarfed ends of tubes 9 and 10 meet with only a slight clearance to allow for thermal expansion, this clearance being greatly exaggerted in the drawing. Formed on the rear end of the pipe 9—e.g. by welding thereto—is the previously mentioned circular flange 11. A similar flange 12 is likewise formed on tube 10. A circular rim 12a on flange 12 abuts against flange 11 and rotatably fits over a rim 11a on flange 11 to form the running joint. A space between rim 11a and the tube 5 can receive cooling air. The channel section casing 13 which embraces these flanges to hold them together, while permitting rotation, is in two halves, 13a and 13b, held together by bolts 14. In Fig. 2 the device is shewn partly in section to reveal the details of the flanges 11 and 12 and the casing 13.

Figure 4:
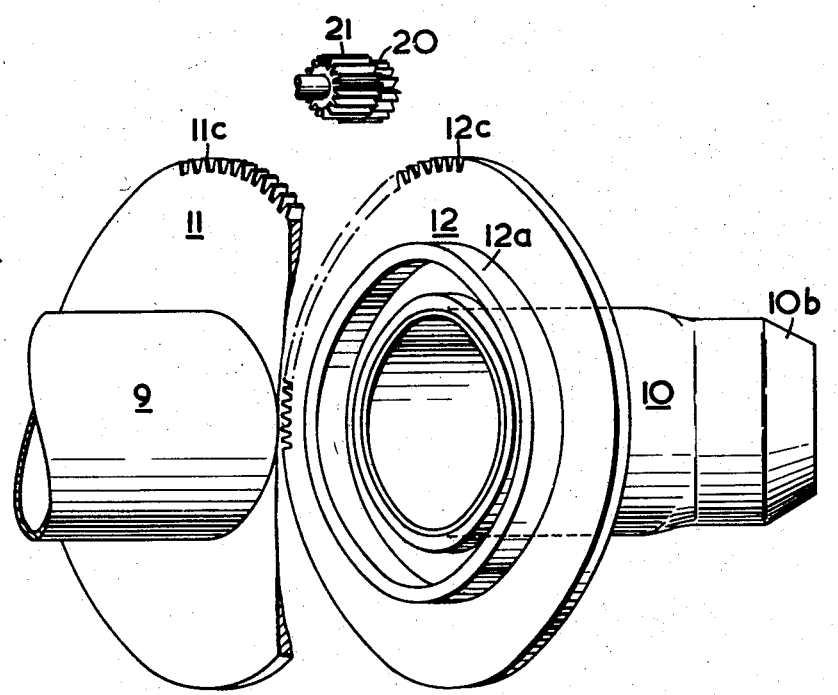
Fig. 4 is a view shewing the nozzle tubes rotated from the position shewn in Fig. 2 to one in which the nozzle is directed rearwardly, but with the parts separated, for clearness.
Figure 5:
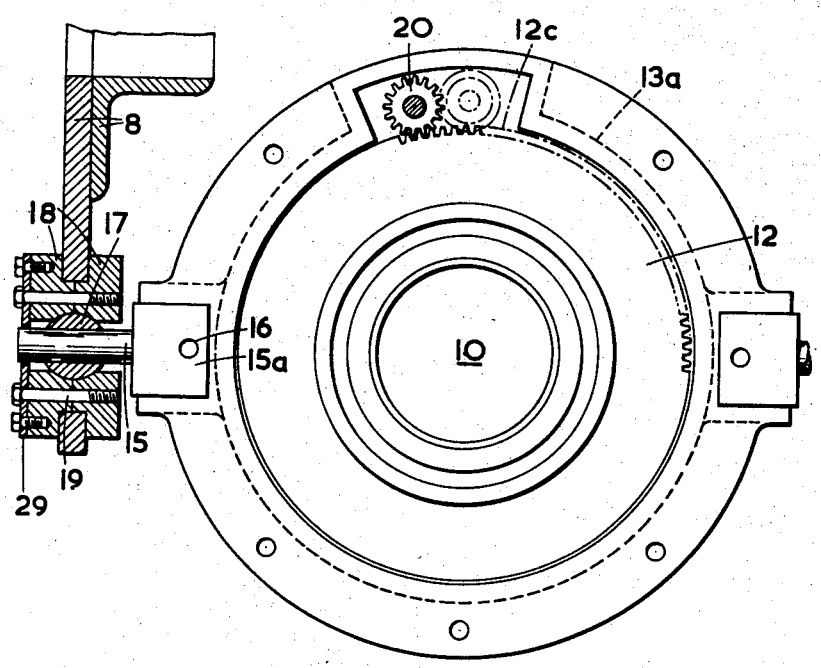
Fig. 5 is a view looking in the direction of arrow V of Fig. 2 on to the rear nozzle tube.

Viewed in the direction of the arrow V in Fig. 2 the half casing 13a and flange 12 therein, as revealed by removing the other half casing 13b and the flange 11, appear as shewn in Fig. 5 which also shews one of the supports for the casing on one of the guides 8. Held between the two halves of casing 13 on one side and secured by bolt 16 is the rectangular shank 15a of a trunnion 15. A similar trunnion on the other side is shewn broken off. Trunnion 15 is supported for sliding and turning in a bearing device shewn in section. This consists of the spherical bearing 17 having a bore through which trunnion 15 slides and the two sliders 18, each formed in two halves held together by screws 19 and plate 29, with spherical seatings for the bearing 17. The sliders 18 are each grooved to fit over and slide along the upper and lower edges of a slot in the plate forming the guide 8. This supporting arrangement can also be seen in Fig. 6 which is an external view with the guide 8 partly cut away. It will be seen that the guide 8 and the slot 8a therein extend horizontally beside the tube 9. There is a similar guiding arrangement on the other side of tube 9. When the nozzle tube 10 is turned through 90° so as to extend rearwardly, this tube and the flange 12 thereon will appear as shewn in Fig. 4. The tube 9 and flange 11 thereon will likewise appear similarly as in Fig. 4 wherein however these two tubes and their flanges have been shown axially separated, for clearness. The casing 13 around them will have correspondingly tilted; such movement is taken up by sliding of the sliders 18 along the slot 8a in each guide, by turning of the spherical bearings 17 in their seatings and by turning and sliding of the trunnions 15.

The combination of trunnions 15 with guides 8 not only prevents rotation of the casing 13 but forms one supporting bearing for the swivelling nozzle unit. The other bearing arrangement 7 is shewn externally in Fig. 6 and in section in Fig. 2. The front end of the tube 9 has a flange 25. The part of the jet pipe connected by the bellows 6 to the rest of the jet pipe 4 (as in Fig. 1) is a short fixed pipe 26 having a rear flange 27. These flanges 25 and 27 abut on a plane perpendicular to the jet pipe axis; they are held together by being embraced by the split bearing member 28, to form a running joint permitting rotation of the flange 25 and tube 9 while opposing escape of gas from the jet. The split bearing 28 is attached to the fixed bracket 30.

Thus far it has been described how the nozzle device is supported and mounted for swivelling. Motive means are provided for rotating the tubes 9 and 10. Thus there may for example be a driving motor mounted on the structure of the aircraft to drive a pinion meshing with gear teeth around the tube 9 and also to drive the transmitter of an electrical synchronous movement; the receiver of this movement can be mounted at the rear of the tube 9 to drive a pinion meshing with gear teeth around the tube 10 so as to rotate this tube at the same speed as tube 9 but in the opposite direction.

Alternatively, as shewn in Figs. 2 and 5, a device common to the two tubes 9 and 10 drives both. Flanges 11 and 12 each have gear teeth 11c and 12c around their periphery—i.e. around the scarfed portions of tubes 9 and 10. The motive element is a motor and gearbox 23—e.g. an electric motor—for rotating the flanges and tubes equally in opposite directions; this motor is mounted for turning relatively to the aircraft with the turning of the scarf plane B at the junction of the two tubes.

Journalled in the half casing 13a as shewn in Fig. 2 is a pinion 20 meshing with the teeth 12c on flange 12 and extending into the space between the flanges. This pinion and the teeth 12c can be best seen in Fig. 5 which shews how a gear enclosure is formed in part of casing 13. Journalled in the half casing 13b as shewn in Fig. 2, is a pinion 21 which meshes with teeth 11c on flange 11 and also extends into the space between the flanges, where it meshes with the pinion 20. Outside the casing the driving pinion 22 is secured to pinion 21. Thus rotation of the driving pinion 21 will rotate the flanges 11 and 12 and hence the tubes 9 and 10 equally and oppositely. The pinion 21 is driven by a pinion of the motor and gearbox unit 23 mounted on bracket 24 secured to the casing 13.

I claim:

1. In combination with a jet propelled aircraft a rearwardly directed jet pipe for passing a jet stream in a rearward direction, a jet nozzle device comprising a first tube supported within said aircraft for rotation about the central longitudinal axis of said tube, the longitudinal axis of said tube being parallel to the central longitudinal axis of said aircraft and lying in the vertical plane passing through the longitudinal axis of said aircraft, said first tube having at one end a circular inlet defined in a plane transverse to the longitudinal axis of said tube, said one end of said first tube engaging sad jet pipe for receiving said jet stream therefrom, the other end of said first tube having a circular outlet defined in a plane which is oblique to the plane of the inlet, a second tube having at one end a circular inlet defined in a plane which is oblique to the central longitudinal axis of said second tube, the circular inlet of said second tube abutting with the circular outlet of said first tube, said second tube having at its other end a jet nozzle for the discharge of said jet stream, the longitudinal axis of said second tube lying in said vertical plane, and unitary means for rotating said second tube about an axis normal to and passing through the center of the plane of its inlet and for simultaneously rotating said first tube in an opposite rotary direction about the longitudinal axis of said first tube, whereby, as said tubes are rotated in opposite directions, the circular outlet of said first tube remains in registry with the circular inlet of said second tube, and the jet nozzle on said second tube moves upwardly and downwardly while the longitudinal axis of said second tube remains in said vertical plane.

2. The improvement as set forth in claim 1 wherein the angle between the longitudinal axis of said first tube and the plane of its outlet is equal to the angle between the longitudinal axis of said second tube and the plane of its inlet.

3. The improvement as set forth in claim 1, including a first circular flange surrounding the circular outlet of said first tube, a second circular flange surrounding the circular inlet of said second tube, and a casing surrounding said flanges for holding them together in abutting relationship, said flanges being provided with gear teeth on the peripheral portions thereof, and said unitary means including gearing means meshing with the gear teeth on said flanges for rotating said flanges equally and in opposite directions.

4. The improvement as set forth in claim 3, including a support means for said casing, said casing being mounted on said support for pivotal movement about an axis normal to said vertical plane and for simultaneous longitudinal sliding movement.

References Cited in the file of this patent
UNITED STATES PATENTS

| | | |
|---|---|---|
| 513,167 | Woodhouse | Jan. 23, 1894 |
| 1,125,642 | Blanchard | Jan. 19, 1915 |
| 1,714,917 | Martin | May 28, 1929 |
| 1,836,336 | Replogle | Dec. 15, 1931 |
| 2,124,474 | Scholtes | July 19, 1938 |
| 2,537,487 | Stone | Jan. 9, 1951 |

FOREIGN PATENTS

| | | |
|---|---|---|
| 805,469 | Germany | May 21, 1951 |